Sept. 8, 1959  S. M. MARCUS  2,903,082
POWERED GOLF CADDY CART

Filed Feb. 17, 1958  2 Sheets-Sheet 1

INVENTOR.
SAMUEL M. MARCUS
BY
ATTORNEY

INVENTOR.
SAMUEL M. MARCUS
BY
ATTORNEY

2,903,082

POWERED GOLF CADDY CART

Samuel M. Marcus, Denver, Colo.

Application February 17, 1958, Serial No. 715,637

1 Claim. (Cl. 180—19)

This invention relates to a power golf cart; that is, to a self-propelled caddy cart for carrying the club bags of golfers. The principal object of the invention is to provide a highly efficient, battery-powered self-propelled golf cart upon which one or more conventional golf club bags may be placed, and which can be conveniently handled by the golfer as he walks from place to place on the course; and to provide a cart of this nature the speed of which may be varied to accommodate differing walking speeds.

Another object of the invention is to so construct the improved power golf cart that it can be quickly and easily collapsed into a compact package for storing or transportation, to so construct the cart that a conventional automotive battery may be employed therein for power purposes, and to so arrange the cart that the battery will be quickly and easily accessible for checking, charging, and replacement.

A further object of the invention is to provide a caster wheel which will resiliently support the cart, and which will readily follow the various movements of the cart, and to provide means for locking the caster wheel in the straight forward position so that one golfer may remove the desired club from his bag, and then point the cart toward his partner so that it will accurately travel in a straight line to the partner to deliver his clubs, even though the two golfers are separated by a considerable distance.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
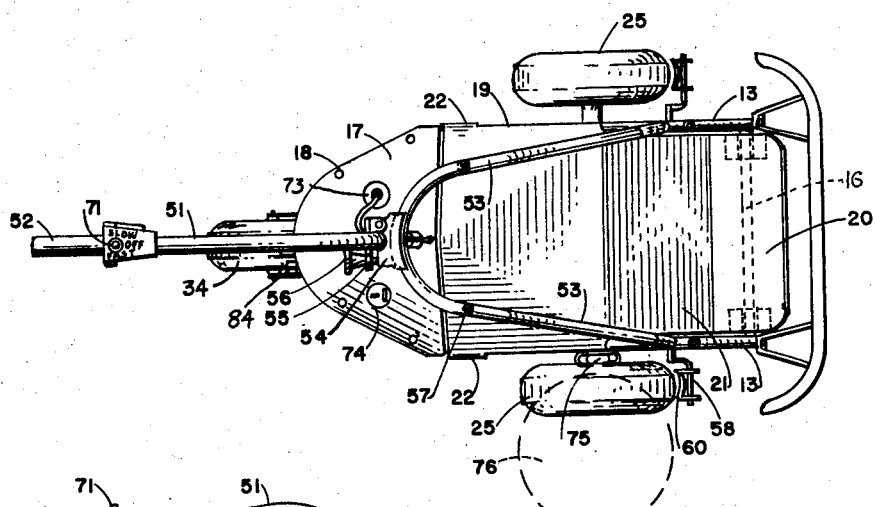
Fig. 1 is a plan view of the improved power caddy cart.

The improved power golf cart is constructed about a supporting frame consisting of two substantially horizontal, spaced-apart, parallel tubular side frame members 10 joined together at their rear extremities by means of a tubular arcuate frame member 11, and maintained in rigid, spaced relation by means of a cross frame member 12.

Each of the side frame members 10 is joined at its forward extremity to an inclined front frame tube 13 braced from its respective side frame member by means of a diagonal brace tube 14. The two frame tubes 13 are joined at their lower extremities by means of a cross tube 16. The upper extremity of each frame tube 13 terminates in a hinge 15.

The rear portion of the supporting frame is covered by means of a fixed cover plate 17 secured to the rear frame member 11 in any desired manner, such as by means of suitable screws 18. The forward portion of the supporting frame is covered by means of a hinged cover plate 19. The hinged cover plate is formed integrally with a bag shelf 20 to which it is joined by an inclined front plate portion 21. The shelf 20 is pivotally mounted on the cross frame member 16 so that the entire cover plate may tilt thereon as shown in broken line at "B" in Fig. 2. The sides of the cover portion 19 at the rear are formed with spring snap ears 22 which, when the cover is forced downwardly, snap about the two side frame members 10 to retain the hinged cover plate 19 in place therein. Both cover plates 17 and 19 have an ornamental convex contour to form a semi-pyramidal shape as illustrated. An open-topped, sheet metal battery box 23 is suspended between the side frame members 10 to receive a conventional automotive storage battery 24.

Figures 10, 11:
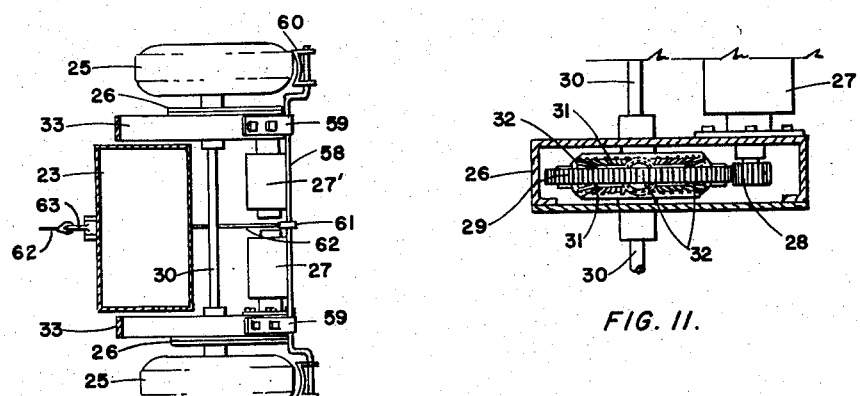
Fig. 10 is a fragmentary, horizontal section, taken on the line 10—10, Fig. 2, illustrating the drive axle and axle mounting of the cart.
Fig. 11 is a detail section through a differential gear box employed on the cart.

The supporting frame is carried, at its forward extremity, upon two rubber-tired drive wheels 25, each wheel being mounted upon an independent drive axle 30 journalled in a gear box 26. Each gear box may be provided with an electric motor as indicated at 27 and 27' in Fig. 10. If preferred, however, the gears may be omitted in one gear box and the two drive axles 30 extended into the other gear box, as shown in Fig. 11. In the latter case only one motor is required as illustrated at 27 in Fig. 10. The gear box may have any type of speed-reduction-differential gearing. As illustrated, the motor 27 is mounted on the side of the gear box and drives a small pinion 28 which rotates a differential ring gear 29 at reduced speed. The ring gear drives two independent differential gears 31 through the medium of suitable planet gears 32. Each differential gear is secured to one of the wheel axles 30 so that the latter shafts may rotate differentially.

The supporting frame is resiliently mounted on the gear boxes 26 by means of U-shaped leaf springs 33 secured at their lower extremities to the tops of the gear boxes 26, and at their upper extremities to the bottoms of the side frame members 10. The rear of the supporting frame is carried upon a rubber tired caster wheel 34 rotatably mounted between the extremities of a U-shaped tilting yoke 35. The two sides of the tilting yoke are tiltably mounted at 36 to the lower extremities of an inverted U-shaped caster fork 37.

The weight imparted to the tilting yoke 35 by the fork 37 is resiliently supported upon a tension spring 38 extending between the fork and the yoke. The fork 37 is provided with a pivot stem 39 which is rotatably mounted in a vertical bearing sleeve 40 formed on and extending downwardly from a medially positioned frame plate 41 which is welded or otherwise secured at each of its extremities below the frame members 11 and 12.

The pivot stem 39 is free to rotate in its bearing sleeve 40 to allow the caster wheel 34 to follow the path of the cart. The caster wheel 34, however, can be locked in the straight-ahead position by means of a swingable latch member 42 affixed to and extending downwardly from a latch shaft 43 actuated by the lever 84 and rotatably mounted in a bearing 44 at one side of the frame plate 41. The latch member 42 is arranged to engage a locking notch in the edge of a locking disc 84', secured to and surrounding the stem 39, when the caster wheel 34 is in the "straight-ahead" position of Fig. 1.

Figures 4, 5:
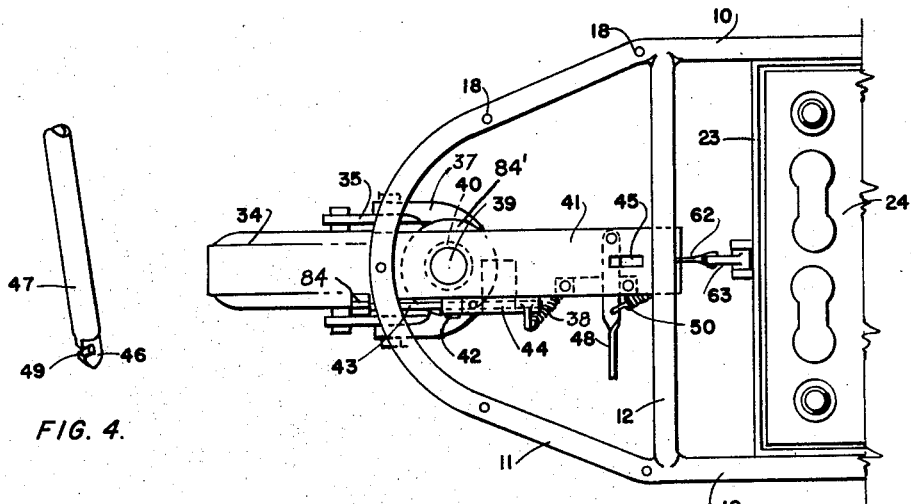
Fig. 4 is a similar view illustrating the lower extremity of a handle post employed in the improved caddy cart.
Fig. 5 is an enlarged, fragmentary, plan view of the rear extremity of the supporting frame of the cart, with its top cover plate removed.

The medial frame plate 41 is provided with an elongated socket opening 45 for receiving a flat tongue 46 formed on the lower extremity of a tubular handle post 47, as shown in Fig. 4. The tongue 46 of the handle post 47 can be locked in the opening 45 by means of a latching lever 48 which is urged horizontally into engagement with a notch 49 in the tongue 46 by means of a spring 50. The handle post 47 extends upwardly through a bracing opening in the fixed top plate 17, thence extends rearwardly at substantially 90° to form a substantially-horizontal handle portion 51 terminating in a hand grip 52. It can be seen that the handle portion 51 and the post 47 can be lifted and removed from the cart by simply releasing the latching lever 48.

Figure 2:
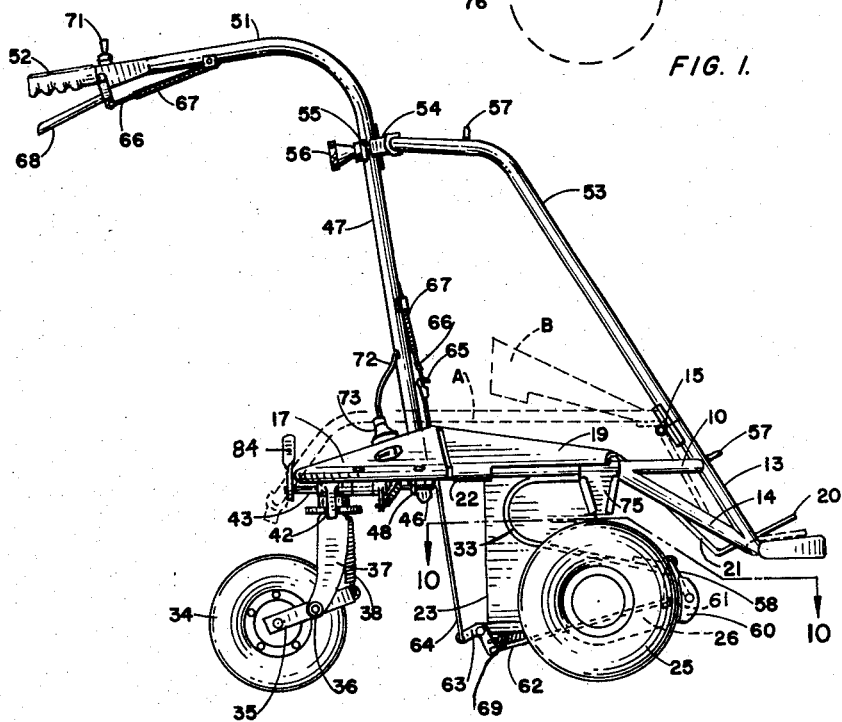
Fig. 2 is a side view thereof.

An inverted, arcuate, U-shaped, tubular bag frame 53 is hingedly mounted at each of its forward lower extremities on one of the hinges 15 so that it may swing from the solid line position in Fig. 2 to the broken line position "A" therein. The bag frame 53 is turned horizontally rearward at its upper rear extremity and is provided with a clamp block 54 having a hinged clamp bar 55 by means of which the bag frame may be securely clamped to the handle post 47 through the medium of a suitable hand screw 56. The bag frame serves to support one or more golf club bags with their bottoms resting on the bag shelf 20. The bags may be secured in position by means of suitable straps or ties extending through attachment eyes 57 on the bag frame 53.

A horizontal brake rod 58 is rotatably mounted in and extends between bearing straps 59 secured on the gear boxes 26. The extremities of the brake rod are turned in eccentrically-offset relation with the brake rod 58, and each eccentric extremity supports a brake shoe 60 which can be brought into frictional engagement with the adjacent drive wheel 25 by simply rotating the brake rod 58 forwardly, or clockwise in Fig. 2. The forward rotation is imparted to the brake rod through the medium of an actuating lever 61 secured to and projecting downwardly from the mid-portion of the rod. A first pull wire 62 extends rearwardly from the actuating lever 61 to a bell-crank lever 63 pivotally mounted rearwardly of and beneath the battery box 23. The bell-crank lever is rotated through the medium of a second pull wire 64 extending upwardly through the cover plate 17 and terminating in an attachment hook 65. The hook 65 is engageable with a loop formed in the lower extremity of a flexible piano wire 66 which extends upwardly through a flexible sheath 67 into the post 47 and through the handle portion 51, terminating in a hand grip lever 68 adjacent the hand grip 52.

Figure 3:
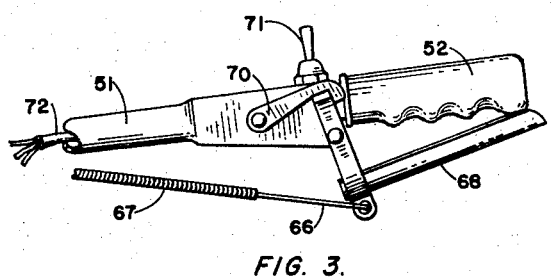
Fig. 3 is an enlarged fragmentary detail view, illustrating the left side of a hand grip with which the improved caddy cart is provided.

It can be seen that if the hand grip lever 68 is gripped toward the hand grip 52, tension will be applied to the piano wire 66 and, through it, to the connecting pull wire 62 to rotate the brake rod and bring both brake shoes simultaneously against the wheels 25. The brake shoes are constantly and resiliently urged away from the wheels by means of a suitable tension spring 69. The brake shoes can be locked in the wheel-gripping position by means of a hooked locking dog 70 arranged to engage and retain the grip lever 68 in the gripping position, as shown in Fig. 3.

The electric current from the battery 24 to the motor 27 is controlled through the medium of a double-throw, single-pole switch 71 mounted on the handle portion 51. The conductors to the switch 71, indicated at 72, extend through the hollow interior of the handle portion 51 and post 47 and terminate in an attachment plug 73 detachably connected to a suitable receiving receptacle in the top plate 17. The top plate 17 is also provided with a charging receptacle 74 to which a conventional battery charging cord may be connected for charging the battery 24 when the cart is not in use.

Figure 12:
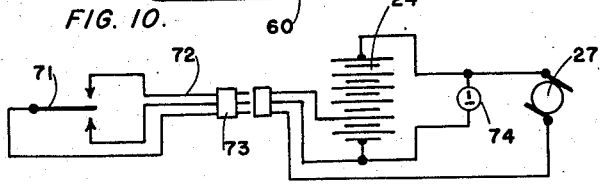
Fig. 12 is a circuit diagram of the electric circuits employed in the improved cart.

It will be noted from the diagram of Fig. 12 that the battery 24 is of the 12-volt type and that one throw of the switch 71 is connected to receive the full 12-volts and that the other throw of the switch is connected to the 5th battery cell to receive only 10-volts. This enables the speed of the motor 27 to be varied between a slow and a fast speed setting without the use of electrical resistance elements with their attendant current losses.

One of the side frame members 10 is provided with a V-shaped, hooked-flanged receiving clip 75 welded or otherwise secured thereto in alignment with one of the wheels 25. This is for the purpose of receiving a folding seat attachment as shown in Figs. 6 through 9. The seat attachment comprises a seat disc 76 which is hinged at one side to the upper extremity of a vertical link bar 78 having a V-shaped fitting 77 which can be lowered into the clip 75 and which will be retained in place in the clip by the hooked-flanges of the clip. The link bar is hinged at its lower extremity to a lever bar 79 which extends outwardly to hinged connection with the lower extremity of a vertical brace link 80 which is hingedly mounted beneath the center of the seat disc 76. A stop fin 81 carried by the brace link 80 contacts the bottom of the seat when the latter is in the extended position of Fig. 7 to prevent the link 80 from folding beyond the substantially vertical position.

Figures 6, 7, 8, 9:
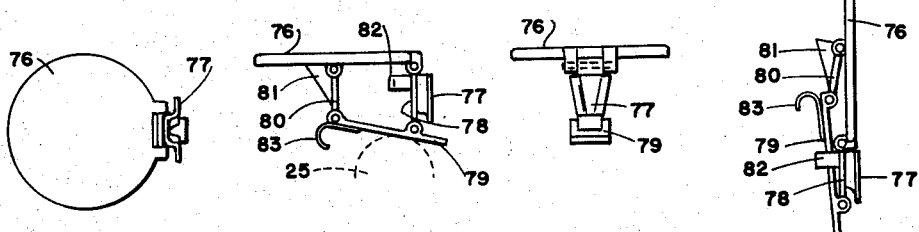
Figs. 6, 7 and 8 are top, side and end views, respectively, of a seat attachment with which the improved cart is provided.
Fig. 9 illustrates the seat attachment in the folded position.

When the seat disc is in the extended or ready for use position, it will occupy the position indicated in broken line at 76 in Fig. 1 and the lever bar 79 will rest upon the tire of the wheel 25, as shown in broken line in Fig. 7, so that the weight of the user will be supported by the wheel and not the supporting frame. The seat attachment can be readily lifted for traveling by simply lifting it to the position of Fig. 9. A finger hook 83 is provided to facilitate lifting the attachment from the clip 75 when desired and a resilient clamping clip 82 mounted on the link bar 78 engages the brace link 80 to support the seat disc in the folded position of Fig. 9. The link 80 is formed slightly longer than the link bar 78, as shown in Fig. 11, so as to prevent the hinged points from aligning in a dead center position which might act to resist unfolding of the linkage.

The operation of the improved cart is believed to be apparent from the above. For storage purposes, the hook 65 can be released from the wire 66, the plug 73 withdrawn from its receptacle, the clamping bar 55 released, and the latching lever 48 withdrawn. The entire post 47 and its attachments can then be lifted from place allowing the bag rack to fold downwardly over the frame into a compact bundle which may be conveniently stored in the luggage compartment of a car.

While a specific form of the improvement has been described and illustrated herein, it is to be understood that the same may be varied within the scope of the appended claim, without departing from the spirit of the invention.

Having thus described the invention, what is claimed and desired secured by Letters Patent is:

A powered golf cart comprising: a substantially horizontal supporting frame; drive wheels supporting the forward extremity of said frame; a caster wheel supporting the rear extremity of said frame; a fixed cover plate having an opening therein covering the rear of said frame and spaced upwardly therefrom, a front cover plate hingedly connected to the front of said frame, a socket centrally located in said frame beneath said opening, a handle post having a reduced extremity seated in said socket, and extending through said opening; latch means removably securing said extremity in said socket; a handle portion extending rearwardly from the upper extremity of said handle post; an inverted U-shaped bag frame; means hingedly mounting the two extremities of said bag frame at the two sides at the front of said supporting frame, said bag frame extending upwardly and rearwardly; a releasable connection between the upper extremity of said bag frame and said post; a battery supported from said supporting frame; an electric motor connected to drive said drive wheels; a control switch mounted on said handle portion; and an electric circuit including said switch, battery and motor for energizing the latter.

References Cited in the file of this patent

UNITED STATES PATENTS

| | | |
|---|---|---|
| 1,546,617 | Caldwell et al. | July 21, 1925 |
| 2,533,549 | Bell | Dec. 12, 1950 |
| 2,586,273 | Steven | Feb. 19, 1952 |
| 2,663,440 | Jackson | Dec. 22, 1953 |
| 2,706,008 | Voigt | Apr. 12, 1955 |
| 2,772,113 | Bernard | Nov. 27, 1956 |
| 2,777,707 | Cloes | Jan. 15, 1957 |
| 2,812,824 | Adams | Nov. 12, 1957 |